(12) United States Patent
Cheng

(10) Patent No.: US 12,427,740 B2
(45) Date of Patent: Sep. 30, 2025

(54) MANUFACTURING METHOD OF CARBON FIBER PROFILED BODIES FOR AEROSPACE, AVIATION AND FIRE FIGHTING

(71) Applicant: Divine Eagle (Shenzhen) Technology Co., Ltd, Guangdong (CN)

(72) Inventor: Qi Cheng, Guangdong (CN)

(73) Assignee: Qi Cheng, Guangdong (CN)

( * ) Notice: Subject to any disclaimer, the term of this patent is extended or adjusted under 35 U.S.C. 154(b) by 194 days.

(21) Appl. No.: 18/477,306

(22) Filed: Sep. 28, 2023

(65) Prior Publication Data

US 2024/0017510 A1 Jan. 18, 2024

Related U.S. Application Data

(63) Continuation of application No. PCT/CN2022/097797, filed on Jun. 9, 2022.

(30) Foreign Application Priority Data

Jun. 24, 2021 (CN) .......................... 202110704269.8

(51) Int. Cl.
| | | |
|---|---|---|
| B29D 99/00 | (2010.01) | |
| B29C 33/44 | (2006.01) | |
| B29C 70/32 | (2006.01) | |
| B29C 70/54 | (2006.01) | |
| C23C 6/00 | (2006.01) | |
| B29K 307/04 | (2006.01) | |
| B29L 31/30 | (2006.01) | |

(52) U.S. Cl.
CPC ........ B29D 99/0003 (2013.01); B29C 33/448 (2013.01); B29C 70/32 (2013.01); B29C 70/54 (2013.01); C23C 6/00 (2013.01); *B29K 2307/04* (2013.01); *B29L 2031/3076* (2013.01)

(58) Field of Classification Search
CPC ....................................................... C23C 6/00
See application file for complete search history.

(56) References Cited

U.S. PATENT DOCUMENTS 5,010,945 A 4/1991 Burke

FOREIGN PATENT DOCUMENTS

| AT | 413704 B | * | 5/2006 |
|---|---|---|---|
| CN | 1042490 A | | 5/1990 |
| CN | 102642011 A | | 8/2012 |
| CN | 109114828 A | | 1/2019 |
| CN | 113430482 A | | 9/2021 |
| TW | 200819557 A | | 5/2008 |
| TW | 201406531 A | | 2/2014 |
| WO | 2006000003 A1 | | 1/2006 |

OTHER PUBLICATIONS

First Office Action for China Application No. 202110704269.8, mailed May 27, 2022.
International Search Report and Written Opinion for PCT/CN2022/097797, mailed Sep. 7, 2022.

* cited by examiner

*Primary Examiner* — Jeffry H Aftergut
(74) *Attorney, Agent, or Firm* — Ming Jiang; OPENPTO US LLC

(57) ABSTRACT

A manufacturing method of carbon fiber profiled bodies for aerospace, aviation and fire fighting is provided, relating to the technical field of carbon fiber preparation, and including the following steps: uniformly winding carbon fiber cloth around an exterior of a core mould and opening a liquid drainage hole; heating a carbon fiber shell, melting the core mould, and discharging a melted liquid of the core mould through the liquid drainage hole; allowing a non-stressed wall of the carbon fiber shell to be in contact with liquid nitrogen and prefabricating a layer of molten metal liquid on a stressed wall of the carbon fiber shell.

16 Claims, 1 Drawing Sheet

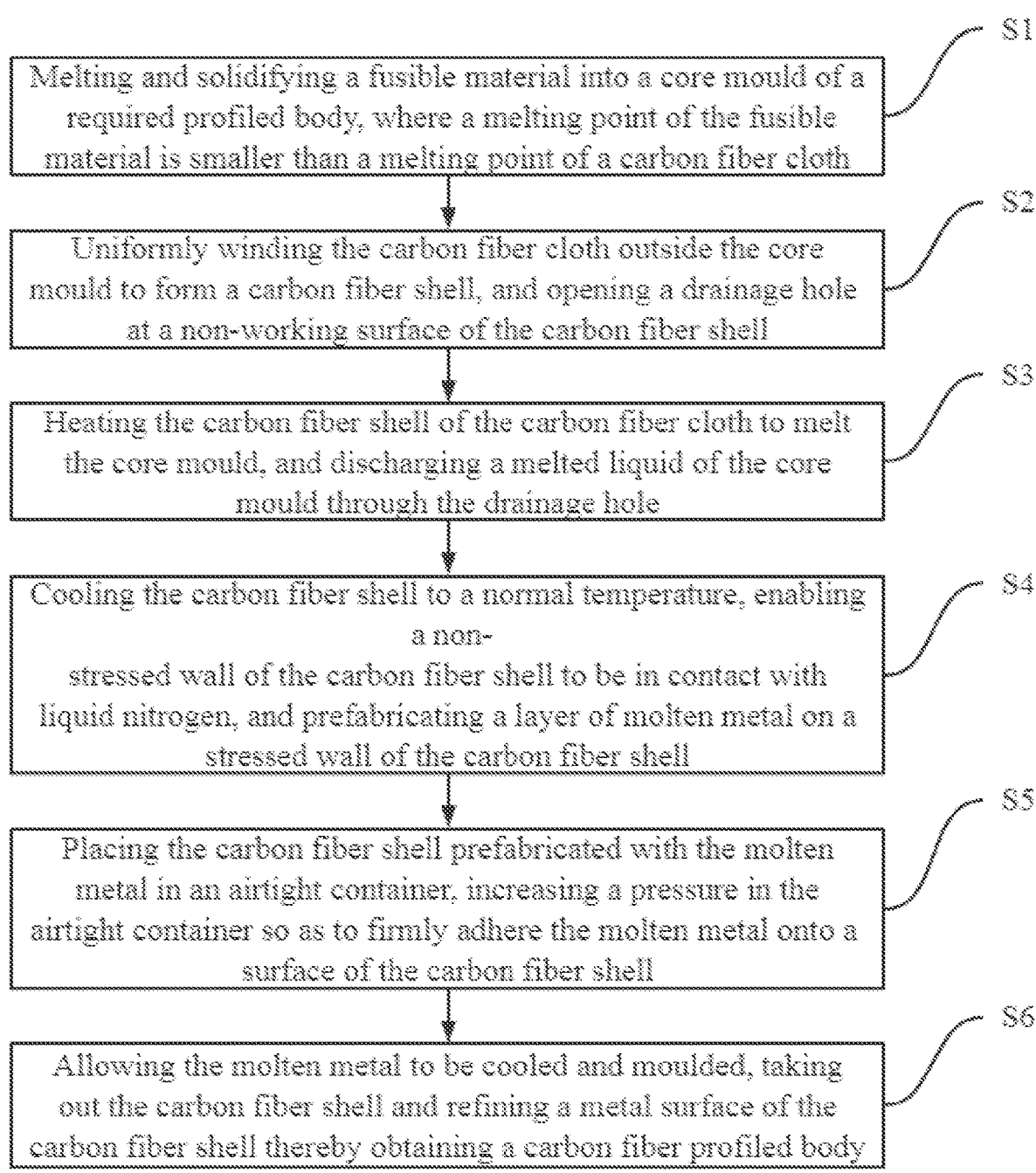

MANUFACTURING METHOD OF CARBON FIBER PROFILED BODIES FOR AEROSPACE, AVIATION AND FIRE FIGHTING

CROSS-REFERENCE TO RELATED APPLICATIONS

This application is a continuation of PCT/CN2022/097797, filed Jun. 9, 2022, and claims priority of Chinese Patent Application No. 202110704269.8, filed on Jun. 24, 2021, the entire contents of which are incorporated herein by reference.

TECHNICAL FIELD

The present application relates to the technical field of preparation of carbon fiber bodies, and in particular to a manufacturing method of carbon fiber profiled bodies for aerospace, aviation and fire fighting.

BACKGROUND

Carbon fiber is a fibrous carbon material with greater strength than steel, less density than aluminium, more corrosion-resistant than stainless steel, higher temperature-resistant than heat-resistant steel, it is a new material that conducts electricity like copper and has many valuable electrical, thermal and mechanical properties.

Carbon fiber is generally not used individually except as a thermal insulation material; it is mostly used as a reinforcing material added to resin, metal, ceramics, concrete and other materials to develop composite materials, and the composite materials reinforced by carbon fiber are used as structural materials for aircraft, electromagnetic shielding and de-electrifying materials, artificial ligaments and other body substitutes as well as being used in the manufacture of rocket hulls, motorboats, industrial robots, automotive leaf springs and driving shafts, etc.

Moreover, the weight of parts prepared using carbon fiber alone is greatly reduced compared to that prepared from composite materials, and researches against manufacturing method of carbon fiber have been carried out to develop a method of preparing required parts by directly using carbon fibers. For instance, a patent application No. CN112721246A entitled "*Manufacturing method of emission pipe of carbon fiber composite material*" discloses a preparation method of carbon fiber composite materials, including preparing an upper mould, a lower mould and a core mould of the emission pipe, with steps of: pouring a releasing agent on a wiping paper, coating the releasing agent in mould cavities of the upper and lower moulds as well as the core mould; coating a layer of glue on the core mould, then cutting and laying a full circle of aerogel on the core mould; sequentially laying carbon fiber prepreg on an outside of the aerogel; placing the core mould into the mould cavities of the upper mould and the lower mould, closing and locking the moulds, followed by heating and curing; cooling and demoulding, removing burrs around the emission pipe, followed by spraying with high-temperature resistant paint on a surface to obtain a final product, where after the aerogel is coated on an outer wall of the core mould, carbon fiber prepreg is laid and the carbon fiber composite material is moulded by heating and curing, and a final product is obtained after processing, realizing the direct preparation of required parts using carbon fiber. However, the carbon fibre is prone to micro-breakage on the surface when it is subjected to stress as a result of its brittleness and weak point force, making it undesirable to be used in fire-fighting and rescue applications, including fire-fighting liquid injection tubes and valve bodies of high-pressure fire extinguishers.

Therefore, there is an urgent need for a manufacturing method of carbon fiber profiled bodies for aerospace, aviation and fire fighting that possesses both the excellent properties of carbon fiber material itself and good structural strength.

SUMMARY

The objective of the present application is to provide a manufacturing method of carbon fiber profiled bodies for aerospace, aviation and fire fighting, so as to solve the problems existing in the prior art; the prepared carbon fiber profiled bodies not only have excellent characteristics of carbon fiber materials, but also have good structural strength.

In order to achieve the above objectives, the present application provides following technical scheme: the present application provides a manufacturing method of carbon fiber profiled bodies for aerospace, aviation and fire fighting, including following steps:

S1, melting and solidifying a fusible material into a core mould of a required profiled body, where a melting point of the fusible material is lower than a melting point of a carbon fiber cloth;

S2, uniformly winding the carbon fiber cloth outside the core mould to form a carbon fiber shell, and opening a drainage hole at a non-working surface of the carbon fiber shell;

S3, heating the carbon fiber shell of the carbon fiber cloth to melt the core mould, and discharging a melted liquid of the core mould through the drainage hole;

S4, cooling the carbon fiber shell to a normal temperature, enabling a non-stressed wall of the carbon fiber shell to be in contact with liquid nitrogen, and prefabricating a layer of molten metal on a stressed wall of the carbon fiber shell;

S5, placing the carbon fiber shell prefabricated with the molten metal in an airtight container, increasing a pressure inside the airtight container so as to firmly adhere the molten metal onto a surface of the carbon fiber shell; and S6, allowing the molten metal to be cooled and moulded, taking out the carbon fiber shell and refining a metal surface of the carbon fiber shell, thereby obtaining a carbon fiber profiled body.

Optionally, in the S4, the prefabricating of molten metal is realized by casting or melting a preset metal, and a method for melting the preset metal includes: prefabricating a metal to be placed on the stressed wall of the carbon fiber shell into a similar shape, and placing on the stressed wall of the carbon fiber shell, and then melting the preset metal.

Optionally, a laser is used to melt the metal, or a high-frequency induction heating device is used to generate a strong magnetic beam with instantaneous polarity change to heat and melt the metal.

Optionally, in the S1, the core mould includes a mould core with a same shape as the required profiled body and a columnar body arranged on a non-working surface of the mould core; and in the S2, the drainage hole is configured at one end of the columnar body far away from the mould core.

Optionally, the drainage hole is connected with a drainage valve, and the drainage valve is provided with a pressure sensor, where the pressure sensor outputs a signal to an electric control system to control the drainage valve in terms of opening.

Optionally, in the S3, when the carbon fiber shell is shaped and a temperature of a whole device is higher than the melting point of the fusible material, heating is performed to maintain the temperature and discharge the melted liquid of the core mould; or, after the whole device is cooled and shaped, the whole device is then heated to enable the temperature of the whole device higher than the melting point of the fusible material and lower than the melting point of the carbon fiber shell, and then the melted liquid of the core mould is discharged.

Optionally, in the S4, wear-resistant materials or high-temperature resistant materials are added into the molten metal to further improve the molten metal in terms of abrasiveness and high-temperature resistance, followed by carburizing or nitriding a surface of a metal layer after the metal layer has been formed.

Optionally, in the S4, a heat required to fully vaporize the liquid nitrogen is not greater than a heat transferred from the molten metal to the carbon fiber shell, and not less than the heat transferred from the molten metal to the carbon fiber shell before the temperature of the molten metal falls below a temperature capable of affecting the carbon fiber shell in terms of quality.

Optionally, the liquid nitrogen for protecting the carbon fiber shell is supplied in a flow to cool the carbon fiber shell.

Optionally, in the S5, for devices with regular or irregular geometries, high-pressure gas is capable of being introduced into the airtight container to increase the pressure inside the airtight container, thereby increasing a pressure on the metal surface formed by the molten metal; and for devices with regular geometric shapes, a blasting pressure method is also capable of being used to increase the pressure on the metal surface; the blasting pressure method includes: carrying out blasting inside the airtight container, and further increasing the pressure on the metal surface by a pressure generated by the blasting; or using gas pulses to stamp directly on a liquid level of the molten metal.

Optionally, the high-pressure gas, a gas blasted by the blasting pressure method and a gas applied by the gas pulses are all inert gases.

Optionally, the high-pressure gas introduced enters the airtight container after being heated by a frequency conversion heating device, and a temperature of the high-pressure gas gradually increases with an increase of ventilation duration, and a temperature gradient of the high-pressure gas is smaller than a temperature gradient of the molten metal during natural solidification.

Optionally, the pressure in the airtight container is controlled to gradually increase to ensure the pressure inside the airtight container during a solidification process of the molten metal is not less than a resilience generated by cooling and solidification of the metal at a same time.

Optionally, one or multiple blastings are capable of being carried out; when one blasting is carried out, an action duration of the pressure generated by the blasting is not shorter than a cooling and solidification duration of the molten metal, and the pressure generated is not smaller than a resilience generated when the molten metal is cooled and solidified; when multiple blasting is carried out, an action duration of pressures generated by the multiple blasting is not shorter than a duration of cooling and solidification of the molten metal; a blasting force in a single blasting is greater than a blasting force of a last blasting, and a pressure generated in each blasting is not smaller than the resilience generated by the cooling and solidification of the metal at the same time.

Optionally, a pulser is used to achieve a pulsed output of the high-pressure gas, generating a pulsed impact force or pressure, under the pulsed output, the molten metal is firmly attached to the surface of the carbon fiber shell, and a pressure and a temperature of a pulsed gas increase with time.

Optionally, the fusible material is paraffin or tin, and the molten metal uses material of iron, copper, steel or alloy steel.

Compared with the prior art, the present application has the following technical effects:

In the present application, the liquid melted by the core mould inside the carbon fiber shell is discharged directly from the liquid drainage hole after the carbon fiber shell has been formed, so that the inside of the carbon fiber shell forms a cavity, which greatly reduces the weight of the carbon fiber shell, and saves operational steps and energy consumed by the apparatus compared to the prior art, in which the carbon fiber shell is formed before the film is extracted using other apparatus; furthermore, in the way of pre-fabricating a layer of molten metal and forming a metal layer in the stressed wall of the carbon fiber shell, under the limited increase in the overall weight of the structure, the characteristics of the metal layer with high toughness, low brittleness and strong point force are utilized to enable the metal layer to serve as a direct stress material, thereby avoiding the problem of easy damage to the carbon fiber when it is combined with the carbon fiber of other parts or the metal of the carbon fiber which has a high degree of brittleness and a weaker point force, so that the profiled body after moulding in the carbon fiber has excellent performance on the basis of its own, as well as good structural strength; the advantages of combining and coordinating between metal surfaces are fully exploited, which in turn enables the moulded carbon fiber special-shaped parts to be applied in the fields of aviation, aerospace, fire fighting and rescue, etc.; moreover, the non-stressed wall of the carbon fiber shell is in contact with liquid nitrogen in such a way that it provides good cooling protection for the carbon fiber shell during the casting process of the molten metal, avoiding thermal damage to the carbon fiber shell caused by the molten metal; in addition, in the process of solidification of the molten metal liquid, the molten metal liquid is firmly attached to the stressed wall surface of the carbon fiber shell by means of applying pressure thereto in a confined space, eliminating the tiny air gap between the metal layer and the carbon fiber shell after the molten metal liquid is naturally solidified, not only improving the strength of the carbon fiber profiled body, enhancing the mutual compatibility of the carbon fiber profiled body and its externally mounted (or internally mounted) at least one metal device (part), but also making it less likely that the metal layer on the stressed wall surface is deformed when it is subjected to an external pressure, and ensuring the service life of the carbon fiber profiled body itself as well as of a device formed using it;

In the present application, the liquid nitrogen is injected to protect the molten metal from thermally damaging the carbon fiber, and on this basis, the heat required for all the liquid nitrogen to be vaporized is not greater than the heat transferred to the carbon fiber shell by the molten metal and is not less than the heat transferred to the carbon fiber shell before the temperature of the molten metal is lower than the temperature at which the mass of the carbon fiber shell is affected, and thus avoiding the problem of the metallurgical organization of metals being damaged by the refrigeration of the liquid nitrogen when the cooling of the liquid nitrogen is greater than the heat transferred by the molten metal;

the high-pressure gas adopted in the present application enters the airtight container after being heated by the frequency conversion heating device, and the temperature of the high-pressure gas gradually becomes higher with the increase of the ventilation duration, and the gradient of the temperature change of the high-pressure gas is smaller than that in the natural solidification process of the molten metal liquid, which prolongs the processing duration of the high-pressure gas on the molten metal liquid, and thus enables the molten metal liquid to be better moulded in the carbon fiber shell, and improves the processing effect; and the pressure at a certain time in the airtight container provided in the present application is not less than the resilience generated by the cooling and solidification of the metal at the same time, which further ensures that the molten metal liquid, after forming a metal layer, is firmly adhered to the outer surface of the carbon fiber shell.

BRIEF DESCRIPTION OF THE DRAWING

For a clearer description of the technical schemes in the embodiments or prior art of the present application, the accompanying drawing to be used in the embodiments is briefly described hereinafter, and it is obvious that the accompanying drawing in the description hereinafter constitutes only some of the embodiments of the present application, and that for a person of ordinary skill in the field, other accompanying drawings are available on the basis of the accompanying drawings without any creative labor effort.

The FIGURE illustrates a process flow of a manufacturing method of carbon fiber profiled body of the present application.

DETAILED DESCRIPTION OF THE EMBODIMENTS

The technical schemes in the embodiments of the present application are described clearly and comprehensively in the following in conjunction with the accompanying drawings in the embodiments of the present application, and it is obvious that the described embodiments are only a part of the embodiments of the present application and not all of the embodiments of the present application. Based on the embodiments in the present application, all other embodiments obtained by a person of ordinary skill in the art without making creative labor fall within the scope of protection of the present application.

The purpose of the present application is to provide a manufacturing method of carbon fiber profiled body for aerospace, aviation and fire fighting, so as to solve the problems existing in the prior art, enable the carbon fiber profiled body not only have excellent characteristics of carbon fiber material itself, but also have good structural strength, and enhance the mutual cooperation between the carbon fiber profiled body and at least one external (or internal) metal device (part).

In order to make the above objectives, features and advantages of the present application more obvious and easier to understand, the present application are further described in detail with the attached drawings and specific embodiments.

As referring to the FIGURE, the present application provides a manufacturing method of carbon fiber profiled body for aerospace, aviation and fire fighting, including the following steps:

S1, a mould is prepared for the desired preparation of the profiled body, the fusible material is melted and injected into the mould, then solidified and shaped and processed into a core mould of the desired profiled body, the melting point of the fusible material is less than the melting point of the carbon fiber cloth, and the fusible material can also be processed by means of extrusion or mechanical machining and so on, to produce the core mould of the desired profiled body;

S2, the core mould is hold by a staff, the carbon fiber cloth is evenly wound on the outside of the core mould, or evenly wound by using a machine on the outside of the core mould; in the winding process, it should be ensured that the force of conveying the carbon fiber cloth strips is uniform, and the pressure of the carbon fiber cloth falling down on the model is uniform, and after the carbon fiber cloth winding is completed, a drainage hole is opened in the non-working surface of the wound carbon fiber cloth layer;

S3, the carbon fiber cloth shell is heated so that the core of the mould inside the carbon fiber cloth shell melts into a liquid state, and then the overall temperature is ensured to be higher than the melting point of the fusible material and lower than the melting point of the carbon fiber by the heating tool, and then the drainage hole is controlled to be downward, and the liquid inside the carbon fiber shell is discharged through the drainage hole; after the liquid inside the carbon fiber shell is discharged, the interior of the carbon fiber shell forms a cavity, which greatly reduces the weight of the carbon fiber shell, and there is no need to extract the film by means of any other apparatus, which saves the operation steps and conserves energy used by the apparatus;

S4, after the liquid inside the carbon fiber shell is emptied, the heating tool is switched off and the carbon fiber shell is cooled down to room temperature, then the next operation is carried out; when the outer wall of the carbon fiber shell is a stressed wall, the staff holds the injection tube of the liquid nitrogen tank or adopts the way of mechanical injection and injects liquid nitrogen into the inner part of the carbon fiber shell through the liquid discharge holes, after the liquid nitrogen injection is completed, a layer of molten metal is prefabricated on the outer wall of the carbon fiber shell; when the inner wall surface of the carbon fiber shell is a stressed wall, the liquid nitrogen is poured on the outer wall surface of the carbon fiber shell or the carbon fiber shell is placed in a liquid nitrogen storage mechanism, and at the same time a layer of molten metal is prefabricated on the inner wall surface of the carbon fiber shell; the objective of the prefabricated molten metal is to form a metal layer in the stress wall of the carbon fiber shell, so that under the limited increase of the overall structural weight, the characteristics of the metal layer of high toughness, low brittleness and strong point force are utilized, enabling the metal layer to act as a direct stress material, thereby avoiding the problem of easy damage to the carbon fiber when it is combined with the carbon fiber or metal of other components with high brittleness and weak point force and making the formed carbon fiber profile have good structural strength on the basis of its own excellent performance, thus giving full play to the superiority of the combination between the metal surfaces; as a result, the shaped carbon fiber profiled parts are applicable to aviation, aerospace, fire-fighting, rescue and other fields; and the purpose of contacting the non-stressed wall of the carbon fiber shell with liquid nitrogen is to provide good cooling protection for the carbon fiber shell during the contact of the molten metal with the stressed wall of the carbon fiber shell, and to avoid thermal damage to the carbon fiber shell caused by the molten metal;

S5, the carbon fiber shell prefabricated with molten metal is placed in the airtight container, where the pressure in the airtight container is increased to enable the molten metal to be firmly adhered to the surface of the carbon fiber shell, thereby eliminating the tiny air gaps between the metal layer and the carbon fiber shell after the molten metal is naturally solidified, resulting in not only increased strength of the carbon fiber profiled body, but also enhanced interplay of the carbon fiber profiled body with its external (or internal) at least one metal device (part), and the metal layer on the stressed wall is not easy to deform when subjected to external pressure, thereby ensuring the service life of the carbon fiber profile itself as well as of the device composed of the carbon fiber profile itself; and S6, after the molten metal is cooled and shaped, the carbon fiber shell is removed and the metal side is refined using the machining platform, thus obtaining the carbon fiber profiled body.

When a more complicated device needs to be processed, the carbon fiber parts that make up the device are individually processed, and then the parts are assembled.

In the S4, the pre-fabrication of the molten metal may be achieved by casting the metal or melting the pre-positioned metal; the melting of the prefabricated metal is carried out in such a way that the metal to be placed on the stressed wall of the carbon fiber shell is prefabricated into a similar shape and placed on the stressed wall of the carbon fiber shell, which is then melted and subsequently processed by applying pressure; and when the casting method is used and the stressed wall of the carbon fiber shell is an inner wall, the carbon fiber shell is controlled to rotate and the casting opening is rotated relatively when the molten metal is injected into the carbon fiber shell, so that the metal is formed into a film quickly and the metal build-up is prevented.

The melting of the preset metal can be done either by melting the metal using a laser or by heating and melting the metal using a high-frequency induction heating device that produces a strong magnetic beam with an instantaneous change in polarity.

As the moulded carbon fiber shell is only provided with a liquid drainage hole at its non-working surface, other auxiliary devices are required to assist in fixing its position during the subsequent casting and placing in the airtight container; in order to reduce the use of other devices, the core mould can be configured to include a mould core of the same shape as that of the profiled body to be prepared as well as a column set at the non-working surface of the mould core; and in the S2, the drainage hole is provided at one end of the column away from the mould core, so that a structure similar to a riser is formed on the moulded carbon fiber shell, which can be clamped to achieve the fixation of the carbon fiber shell in the subsequent steps, and after the overall process is completed, it is possible to remove the part.

A drainage valve can be connected to the drainage hole, and the drainage hole can be opened and closed through the drainage valve. The drainage valve is configured with a pressure sensor, and the pressure sensor outputs a signal to the electric control system to control the opening of the valve. When the internal mould core melts, the volume increases and the drainage valve can be opened automatically; the drainage valve is removed after the processing of the profiled body is completed.

In the S3, the discharging of the liquid melted from the core mould can be accomplished in different time periods, one being: when the carbon fiber shell is formed and the temperature of the overall device is higher than the melting point of the fusible material, heating tools are used to maintain this temperature and to drain the melted liquid from the core mould; and the other being: after the whole device is cooled and moulded, the heating tools are used to heat the whole device so that the temperature of the whole device is higher than the melting point of the fusible material and lower than the melting point of the carbon fiber shell, and then the liquid melted by the core mould is discharged.

In the S4, wear resistant materials or high temperature resistant materials or other materials may be added to the molten metal according to the working conditions of the desired profiled part, so as to improve the abrasive properties and high temperature resistance or other properties, or carburisation treatment or nitriding treatment may be carried out on the surface of the metal layer after the metal layer has been formed, which may be selected according to the actual working conditions.

In order to prevent the thermal damage of the molten metal to the carbon fiber shell when the liquid nitrogen is insufficient or the cold damage of the liquid nitrogen to the carbon fiber shell when the liquid nitrogen is too much, it is therefore necessary to control the heat required to vaporize all of the liquid nitrogen in step S4 to be not greater than the heat transferred to the carbon fiber shell by the molten metal, and not less than the heat transferred to the carbon fiber shell before the temperature of the molten metal is lower than that of the carbon fiber shell, i.e., before injecting the liquid nitrogen and casting, it is necessary to control the duration of vaporizing the liquid nitrogen and cooling time to be given to the carbon fiber shell, so that the quality of the carbon fiber shell will not be damaged by the heat of the molten metal, and the metallographic structure of the metal is not damaged due to the cooling of liquid nitrogen, which will affect the strength and other physical properties.

As the minimum temperature of destroying the carbon fiber shell is around $-180°$ C., a heat insulation layer may be added to the non-stressed wall of the carbon fiber shell to ensure that the temperature of the non-stressed wall of the carbon fiber shell is higher than $-180°$ C., so as to avoid the damage of the carbon fiber shell caused by the time difference between the injection of liquid nitrogen and the metal melting liquid prefabrication, the heat insulation layer may be selected according to the temperature of liquid nitrogen, or the temperature of injected liquid nitrogen may be regulated by using the inverter equipment directly so that the temperature of the injected liquid nitrogen is higher than $-180°$ C.

In order to ensure that the liquid nitrogen is at a low temperature, the liquid nitrogen that protects the carbon fiber is supplied in a flow to cool the carbon fiber shell.

In the S5, the pressure on the metal surface moulded by the molten metal can be increased by introducing high-pressure gas into the airtight container to increase the pressure inside the airtight container for both devices with regular or irregular geometrical shapes; in the case of devices with regular geometrical shapes, the pressure inside the airtight container may also be increased by means of a bursting pressure method; the bursting pressure method includes either blasting inside the airtight container, increasing the pressure on the metal surface by exploiting the pressure generated by the blasting, or directly stamping the surface of the molten metal by means of gas pulses.

To prevent oxidation of the metal, the high-pressure gas, the gas blown by the blasting pressure method, and the gas applied by the gas pulses are all inert gases.

The high-pressure gas is configured to enter the airtight container after being heated by the frequency conversion heating device, and with the increase of the ventilation time, the frequency converter controls the temperature of the high-pressure gas to be gradually increased, and the gradient of the temperature change of the high-pressure gas is smaller than that of the molten metal liquid during the natural solidification process, which prolongs the processing duration of the high-pressure gas on the molten metal liquid, and thus enables the molten metal to be better pressurized onto the carbon fiber shell for shaping, with improved processing effect; the change of the pressure of the high-pressure gas can be controlled by changing the output power of the frequency converter to the air compressor.

When the method of increasing the pressure inside the airtight container by introducing high-pressure gas into the airtight container is adopted, it is necessary to control the pressure inside the airtight container to be gradually increased, so as to ensure that in the process of solidification of the molten metal liquid, the pressure inside the airtight container is not lower than the resilience produced by the metal cooling and solidification at the same time, which further ensures that the molten metal liquid, after forming a metal layer, can be firmly adhered to the outer surface of the carbon fiber shell.

While using the blasting pressure method to increase the pressure inside the airtight container, one or more blastings can be carried out; when one blasting is carried out, the action duration of the pressure generated by the blasting is not smaller than the cooling and solidification duration of the molten metal, and the pressure generated is not smaller than the resilience generated when the molten metal is cooled and solidified, which further ensures that after the formation of the metal layer of the molten metal, the molten metal can be firmly adhered to the outer surface of the carbon fiber casing; as for carrying out multiple blasting, the action duration of the pressure generated by multiple blasting is not smaller than the cooling and solidification duration of the molten metal, the blasting force of a single blasting is greater than that of the last blasting, and the pressure generated by each blasting is not smaller than the resilience generated by the cooling and solidification of the metal at the same time, which further ensures that the molten metal is able to be firmly adhered to the outer surface of the carbon fiber shell after the formation of the metal layer.

When the gas pulse method is adopted, the pulser is used to achieve the pulsed output of high-pressure gas, producing pulse impact or pressure, under which the molten metal is firmly attached to the surface of the carbon fiber shell; the pressure of the pulsed gas increases with the increase of time, and the temperature of the pulsed gas is controlled to increase with the increase of time since the pulse is supplied in an intermittent manner, and the gradient of temperature lowering is required to be ensured; the organization and properties of the metal are improved when using the pulse method, and the internal organization of the metal undergoes significant changes after the pulse pressure stamping process; the molten metal is often internally loose, with coarse grains, uneven organization, compositional segregation and other defects, after high-pressure gas pulse stamping and pressure processing, the loose organization is densely packed, with densified interior, the coarse dendrites are broken, the grains are refined, and the segregation is improved; the metal obtained by high-pressure gas pulse stamping has good stability, reasonable and refined fiber organization, improved distribution of the second phase, and the plasticity, impact toughness and fatigue properties of the metal are greatly improved, with small variations in the properties between the metals.

The fusible materials are materials such as paraffin or tin, and the molten metal liquid is prepared from materials such as iron, copper, steel or alloy steel, etc. The materials of molten metal liquid can be selected according to the actual demand.

Adaptive changes according to actual needs are within the protection scope of the present application.

It should be noted that it is apparent to those skilled in the art that the present application is not limited to the details of the above exemplary embodiments, and that it is capable of being realized in other specific forms without departing from the spirit or essential features of the present application. Accordingly, the embodiments are to be regarded as exemplary and non-limiting in every point of view, and the scope of the present application is limited by the appended claims and not by the foregoing description, and is therefore intended to encompass all variations falling within the meaning and scope of the equivalent elements of the claims. Any appended markings in the claims should not be regarded as limiting the claims to which they relate.

Specific embodiments are applied in this application to illustrate the principles and implementation of the present application, and the above description of the embodiments is only used to facilitate the understanding of the method of the present application and the core idea of the present application; at the same time, for the general technical personnel in the field, there will be changes in the specific implementation and the application scope in accordance with the idea of the present application. In summary, the contents of this specification should not be construed as a limitation of the present application.

What is claimed is:

1. A manufacturing method of carbon fiber profiled bodies for aerospace, aviation and fire fighting, comprising following steps:

S1, melting and solidifying a fusible material into a core mould of a required profiled body, where a melting point of the fusible material is smaller than a melting point of a carbon fiber cloth;

S2, uniformly winding the carbon fiber cloth outside the core mould to form a carbon fiber shell, and opening a drainage hole at a non-working surface of the carbon fiber shell;

S3, heating the carbon fiber shell of the carbon fiber cloth to melt the core mould, and discharging a melted liquid of the core mould through the drainage hole;

S4, cooling the carbon fiber shell to a normal temperature, enabling a non-stressed wall of the carbon fiber shell to be in contact with liquid nitrogen, and prefabricating a layer of molten metal on a stressed wall of the carbon fiber shell; liquid nitrogen provides good cooling protection for the carbon fiber shell during a casting process of the molten metal, avoiding thermal damage to the carbon fiber shell caused by the molten metal;

S5, placing the carbon fiber shell prefabricated with the molten metal in an airtight container, increasing a pressure in the airtight container so as to firmly adhere the molten metal onto a surface of the carbon fiber shell; and S6, allowing the molten metal to be cooled and moulded, taking out the carbon fiber shell and refining a metal surface of the carbon fiber shell thereby obtaining a carbon fiber profiled body.

2. The manufacturing method of carbon fiber profiled bodies for aerospace, aviation and fire fighting according to claim 1, wherein in the S4, the prefabricating of molten metal is realized by casting or melting a preset metal, and a method for melting the preset metal comprises: prefabricating a metal to be placed on the stressed wall of the carbon fiber shell into a similar shape, and placing on the stressed wall of the carbon fiber shell, and then melting the preset metal.

3. The manufacturing method of carbon fiber profiled bodies for aerospace, aviation and fire fighting according to claim 2, wherein a laser is used to melt the metal, or a high-frequency induction heating device is used to generate a strong magnetic beam with instantaneous polarity change to heat and melt the metal.

4. The manufacturing method of carbon fiber profiled bodies for aerospace, aviation and fire fighting according to claim 1, wherein in the S1, the core mould comprises a mould core with a same shape as the required profiled body and a columnar body arranged on a non-working surface of the mould core; and in the S2, the drainage hole is configured at one end of the columnar body far away from the mould core.

5. The manufacturing method of carbon fiber profiled bodies for aerospace, aviation and fire fighting according to claim 4, wherein the drainage hole is connected with a drainage valve, and the drainage valve is provided with a pressure sensor, where the pressure sensor outputs a signal to an electric control system to control the drainage valve in terms of opening.

6. The manufacturing method of carbon fiber profiled bodies for aerospace, aviation and fire fighting according to claim 1, wherein in the S3, when the carbon fiber shell is shaped and a temperature of a whole device is higher than the melting point of the fusible material, heating is performed to maintain the temperature and discharge the melted liquid of the core mould; or, after the whole device is cooled and shaped, the whole device is then heated to enable the temperature of the whole device higher than the melting point of the fusible material and lower than the melting point of the carbon fiber shell, and then the melted liquid of the core mould is discharged.

7. The manufacturing method of carbon fiber profiled bodies for aerospace, aviation and fire fighting according to claim 1, wherein in the S4, wear-resistant materials or high-temperature resistant materials are added into the molten metal to further improve the molten metal in terms of abrasiveness and high-temperature resistance, followed by carburizing or nitriding a surface of a metal layer after the metal layer has been formed.

8. The manufacturing method of carbon fiber profiled bodies for aerospace, aviation and fire fighting according to claim 1, wherein in the S4, a heat required to fully vaporize the liquid nitrogen is not greater than a heat transferred from the molten metal to the carbon fiber shell, and not less than the heat transferred from the molten metal to the carbon fiber shell before the temperature of the molten metal falls below a temperature capable of affecting the carbon fiber shell in terms of quality.

9. The manufacturing method of carbon fiber profiled bodies for aerospace, aviation and fire fighting according to claim 8, wherein the liquid nitrogen for protecting the carbon fiber shell is supplied in a flow to cool the carbon fiber shell.

10. The manufacturing method of carbon fiber profiled bodies for aerospace, aviation and fire fighting according to claim 1, wherein in the S5, for devices with regular or irregular geometries, high-pressure gas is capable of being introduced into the airtight container to increase the pressure inside the airtight container, thereby increasing a pressure on the metal surface formed by the molten metal; and for devices with regular geometric shapes, a blasting pressure method is also capable of being used to increase the pressure on the metal surface; the blasting pressure method comprises: carrying out blasting inside the airtight container, and further increasing the pressure on the metal surface by a pressure generated by the blasting; or using gas pulses to stamp directly on a liquid level of the molten metal.

11. The manufacturing method of carbon fiber profiled bodies for aerospace, aviation and firefighting according to claim 10, wherein the high-pressure gas, a gas blasted by the blasting pressure method and a gas applied by the gas pulses are all inert gases.

12. The manufacturing method of carbon fiber profiled bodies for aerospace, aviation and fire fighting according to claim 10, wherein the high-pressure gas introduced enters the airtight container after being heated by a frequency conversion heating device, and a temperature of the high-pressure gas gradually increases with an increase of ventilation duration, and a temperature gradient of the high-pressure gas is smaller than a temperature gradient of the molten metal during natural solidification.

13. The manufacturing method of carbon fiber profiled bodies for aerospace, aviation and fire fighting according to claim 12, wherein the pressure inside the airtight container is controlled to gradually increase to ensure the pressure inside the airtight container during a solidification process of the molten metal is not less than a resilience generated by cooling and solidification of the metal at a same time.

14. The manufacturing method of carbon fiber profiled bodies for aerospace, aviation and fire fighting according to claim 10, wherein one or multiple blastings are capable of being carried out; when one blasting is carried out, an action duration of the pressure generated by the blasting is not shorter than a cooling and solidification duration of the molten metal, and the pressure generated is not smaller than a resilience generated when the molten metal is cooled and solidified; when multiple blasting is carried out, an action duration of pressures generated by the multiple blasting is not shorter than a duration of cooling and solidification of the molten metal; a blasting force in a single blasting is greater than a blasting force of a last blasting, and a pressure generated in each blasting is not smaller than the resilience generated by the cooling and solidification of the metal at the same time.

15. The manufacturing method of carbon fiber profiled bodies for aerospace, aviation and fire fighting according to claim 10, wherein a pulser is used to achieve a pulsed output of the high-pressure gas, generating a pulsed impact force or pressure, under the pulsed output, the molten metal is firmly attached to the surface of the carbon fiber shell, and a pressure and a temperature of a pulsed gas increase with time.

16. The manufacturing method of carbon fiber profiled bodies for aerospace, aviation and fire fighting according to claim 1, wherein the fusible material is paraffin or tin, and the molten metal uses materials of iron, copper, or steel.

* * * * *